US009781026B2

United States Patent
Joshi et al.

(10) Patent No.: US 9,781,026 B2
(45) Date of Patent: Oct. 3, 2017

(54) SYSTEM AND METHOD TO PREVENT POLLING OVERLOAD FOR DETECTION OF PRESENCE INFORMATION

(71) Applicant: Avaya Inc., Santa Clara, CA (US)

(72) Inventors: Vivek Joshi, Pune (IN); Dhananjay Shende, Pune (IN)

(73) Assignee: Avaya Inc., Santa Clara, CA (US)

( * ) Notice: Subject to any disclaimer, the term of this patent is extended or adjusted under 35 U.S.C. 154(b) by 99 days.

(21) Appl. No.: 14/717,161

(22) Filed: May 20, 2015

(65) Prior Publication Data

US 2016/0344613 A1    Nov. 24, 2016

(51) Int. Cl.
*H04L 12/66*  (2006.01)
*H04L 12/715*  (2013.01)
*H04L 29/06*  (2006.01)

(52) U.S. Cl.
CPC .......... *H04L 45/04* (2013.01); *H04L 65/1006* (2013.01)

(58) Field of Classification Search
None
See application file for complete search history.

(56) References Cited

U.S. PATENT DOCUMENTS

| 9,319,431 | B2 * | 4/2016 | Sparks | H04L 65/1006 |
| 2006/0112170 | A1 * | 5/2006 | Sirkin | H04L 29/12066 709/217 |
| 2008/0317238 | A1 * | 12/2008 | Cai | H04L 41/5087 379/220.01 |
| 2009/0094361 | A1 * | 4/2009 | Srinivasan | H04L 65/1073 709/224 |
| 2009/0245492 | A1 * | 10/2009 | Baker | H04L 67/14 379/112.01 |
| 2014/0078887 | A1 * | 3/2014 | Yu | H04L 43/0811 370/219 |
| 2014/0108525 | A1 * | 4/2014 | Wohlert | G06Q 50/01 709/204 |
| 2014/0143413 | A1 * | 5/2014 | Fang | H04L 65/1016 709/224 |
| 2014/0153707 | A1 * | 6/2014 | Rais | H04L 67/1002 379/196 |
| 2014/0258551 | A1 * | 9/2014 | Ye | H04L 67/14 709/228 |
| 2015/0229562 | A1 * | 8/2015 | Jenkins | H04L 45/306 370/218 |

(Continued)

*Primary Examiner* — Otis L Thompson, Jr.
(74) *Attorney, Agent, or Firm* — Sheridan Ross P.C.

(57) ABSTRACT

A feature server determines a hierarchical network topology for identifying presence information of communication endpoints. The hierarchical network topology comprises at least a first level and an endpoint level. The feature server queries a communication device at the first level to determine if the communication device at the first level is reachable via one or more routes. In response to determining that the communication device at the first level is not reachable via any of the one or more routes, the feature server forbears from querying one or more communication endpoints associated with the communication device at the first level for the presence information. In response to determining that the communication device at the first level is now reachable via the one or more routes, the feature server queries the one or more communication endpoints associated with the communication device at the first level for the presence information.

20 Claims, 9 Drawing Sheets

(56) References Cited

U.S. PATENT DOCUMENTS

| | | | |
|---|---|---|---|
| 2015/0304372 A1* | 10/2015 | Catz | H04M 3/22 |
| | | | 709/204 |
| 2015/0319301 A1* | 11/2015 | Arbe | H04L 65/1069 |
| | | | 370/259 |
| 2015/0365370 A1* | 12/2015 | Gvildys | H04L 51/30 |
| | | | 709/206 |
| 2016/0352838 A1* | 12/2016 | Larkin | H04L 45/22 |
| 2017/0013025 A1* | 1/2017 | Shakhov | H04L 65/1046 |
| 2017/0094012 A1* | 3/2017 | Anand | H04L 67/2852 |

\* cited by examiner

SYSTEM AND METHOD TO PREVENT POLLING OVERLOAD FOR DETECTION OF PRESENCE INFORMATION

TECHNICAL FIELD

The systems and methods disclosed herein relate to communication systems and in particular to hierarchical communication systems.

BACKGROUND

Detecting if communication endpoints are reachable in a contact center environment is critical. The contact center needs to have accurate information of whether an agent is reachable in order to know where to direct communications, such as, incoming voice calls. If an agent's availability information is unknown, calls may be routed to agents that are not available. The result is that calls may be lost or can remain in queues for a long duration of time. Lost calls and long wait times are revenue impacting events for the contact center.

Currently, a feature server for the contact center periodically polls all the communication endpoints in the contact center regardless if communication endpoints are reachable or not. A successful response implies that an agent's communication endpoint is reachable while no response indicates that an agent's communication endpoint is not reachable. In many cases, a network may have many routing elements. This results in multiple routes that may exist to the same communication endpoint. If the polling fails using one of the routes, the polling process tries to use the alternate routes. To prevent a temporary network glitch affecting whether the communication endpoint is reachable, this process has to be repeated multiple times to declare a communication endpoint reachable. This problem increases as contact centers become more distributed having multiple agents in multiple locations.

However, polling a communication endpoint multiple times can lead to high Central Processing Unit (CPU) usage during an outage condition. For example, in a distributed contact center, if a location comprising a large number of communication endpoints is unreachable because of a network failure, CPU usage may spike to 100%, even on an idle system or lightly loaded system. This can cause a service outage for the entire contact center, resulting in lost revenue for the contact center.

SUMMARY

Systems and methods are provided to solve these and other problems and disadvantages of the prior art. A feature server determines a hierarchical network topology for identifying presence information of communication endpoints. The hierarchical network topology comprises at least a first level and an endpoint level. The feature server queries a communication device at the first level (e.g., a Private Branch Exchange) to determine if the communication device at the first level is reachable via one or more routes on a computer network. In response to determining that the communication device at the first level is not reachable via any of the one or more routes, the feature server forbears from querying one or more communication endpoints associated with the communication device at the first level for the presence information. In response to determining that the communication device at the first level is now reachable via the one or more routes, the feature server queries the one or more communication endpoints associated with the communication device at the first level for the presence information.

DETAILED DESCRIPTION

Figure 1A:
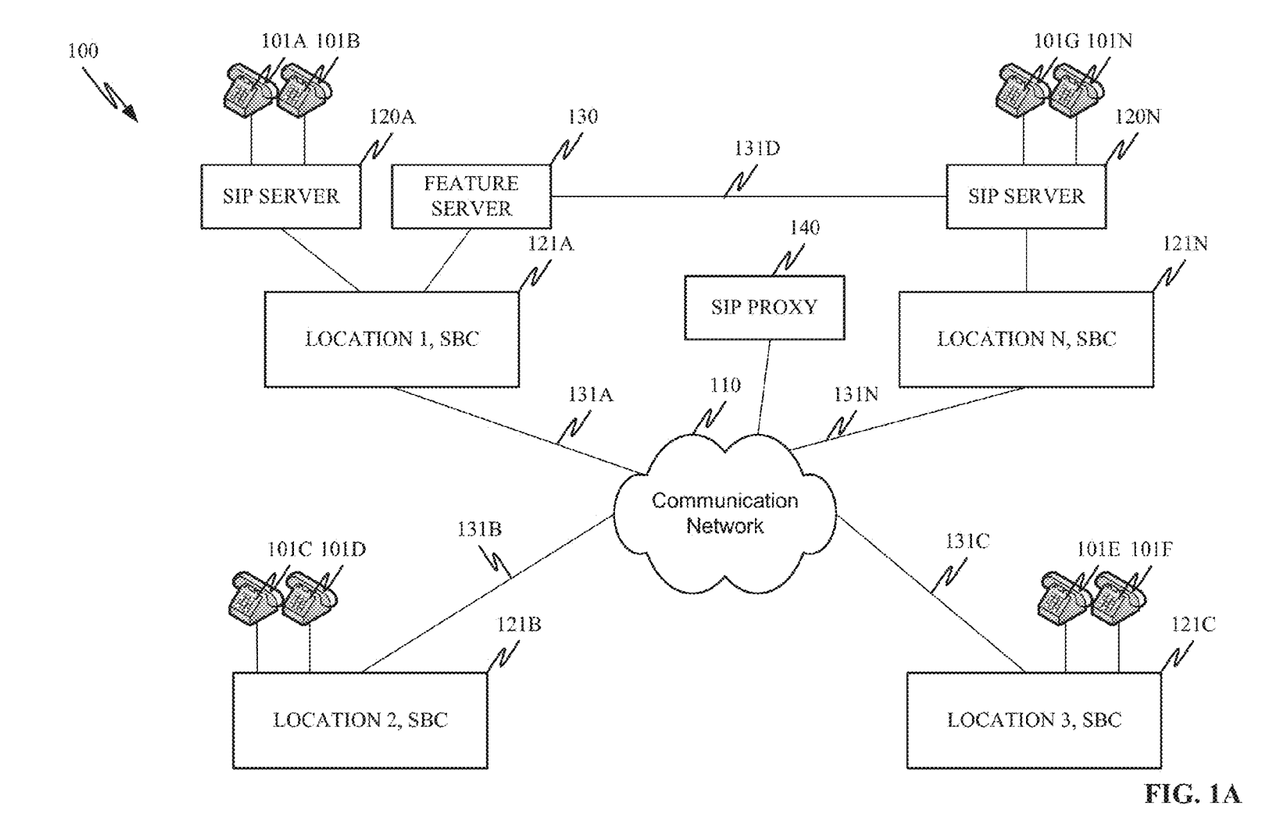
FIG. 1A is a block diagram of a first illustrative system for identifying whether communication endpoints at a location are reachable.

FIG. 1A is a block diagram of a first illustrative system 100 for identifying whether communication endpoints 101 at a location are reachable. The first illustrative system 100 comprises communication endpoints 101A-101N, a communication network 110, SIP servers 120A-120N, Session Border Controllers (SBCs) 121A-121N, a feature server 130, communication links 131A-131N, and a SIP proxy server 140.

The communication endpoint 101 can be or may include any communication device that can communicate on the communication network 110, such as a Personal Computer (PC), a telephone, a video system, a cellular telephone, a Personal Digital Assistant (PDA), a tablet device, a notebook device, and/or the like. As shown in FIG. 1A, any number of communication endpoints 101A-101N may be able to communicate on the communication network 110. In FIG. 1A, the SIP server 120A, the SIP server 120N, the SBC 121B, and the SBC 121C each include two connected communication endpoints 101. However, in other embodiments, each of these may have more or less connected communication endpoints 101.

The communication network 110 can be or may include any collection of communication equipment that can send and receive electronic communications, such as the Internet, a Wide Area Network (WAN), a Local Area Network (LAN), a Voice over IP (VoIP) Network, the Public Switched Telephone Network (PSTN), a packet switched network, a circuit switched network, a cellular network, a fiber optic network, a combination of these, and the like. The communication network 110 can use a variety of electronic protocols, such as Ethernet, Internet Protocol (IP), Session Initiation Protocol (SIP), Integrated Services Digital Network (ISDN), H.323, Web Real-Time-Communication (WebRTC), video protocols, email protocols, Instant Messaging (IM) protocols, and/or the like. Thus, the communication network 110 is an electronic communication network configured to carry electronic messages via packets and/or circuit switched communications.

The SIP server 120 can be or may include any hardware/software that can route communications, such as, a Private Branch Exchange (PBX), a central office switch, a router, a communication system, a SIP proxy server 140, a session manager, a communication manager, and/or the like. In FIG. 1A, any number of SIP servers 120 (from 1 to N, where N is an integer) may be used.

The Session Border Controllers (SBC's) 121A-121N can be or may include any hardware/software that can provide network services, such as a Network Address Translator (NAT), a proxy server, a firewall, and/or the like. In FIG. 1A, any number of SBCs 121 may be included. In one embodiment, the first illustrative system 100 may not include any SBCs 121.

The feature server 130 can be or may include any hardware/software that can manage the first illustrative system 100, such as a PBX, a central office switch, a router, a network management system, and/or the like. The feature server 130 is shown separate from the SIP server 120. However, in other embodiments, the feature server 130 may be part of the SIP server 120.

The communication links 131A-131N can be or may include any kind of communication link, such as a wired communication link, a wireless communication link, a fiber optic communication link, and/or the like. The communication links 131A-131N may be a combination of communication links 131 and/or communication networks 110.

The SIP proxy server 140 can be or may include any hardware/software that can provide proxy services for SIP communication sessions. The SIP proxy server 140 can provide SIP proxy services for all or a portion of the first illustrative system 100.

Figure 1B:
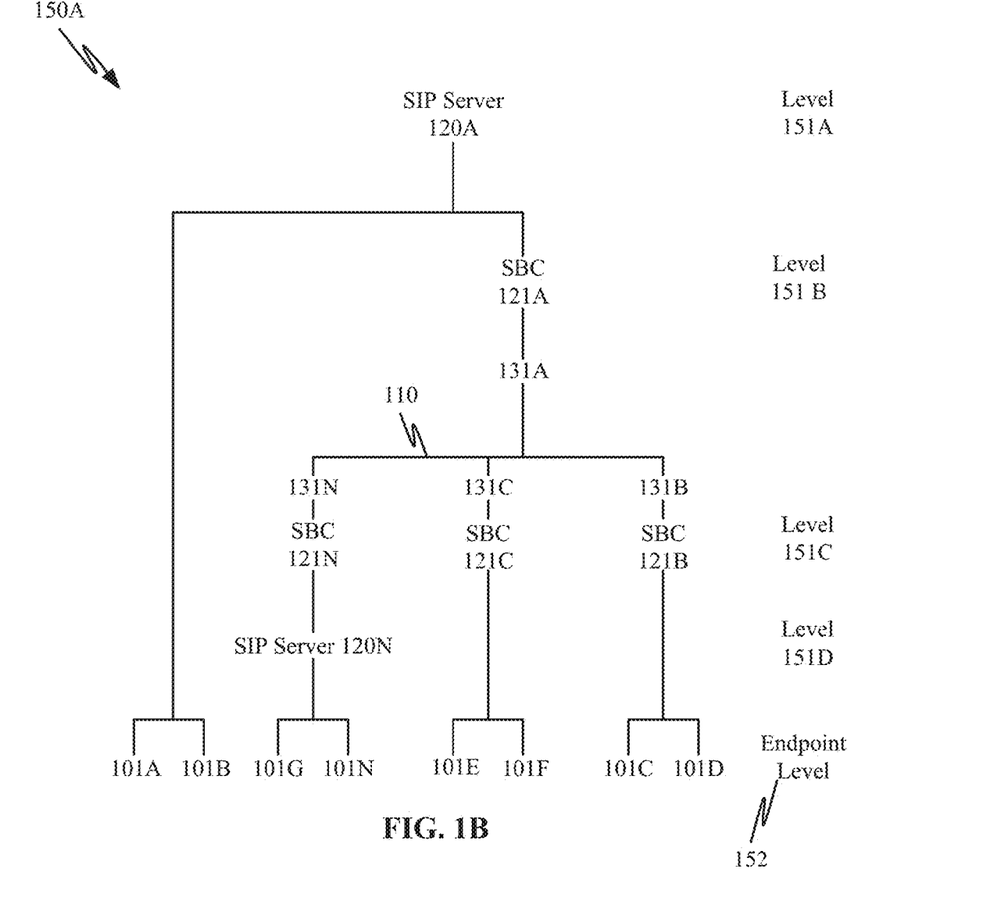
FIG. 1B is a diagram of a hierarchical tree for a first SIP server.

FIG. 1B is a diagram of a hierarchical tree 150A for the SIP server 120A. The hierarchical tree 150A is used by the feature server 130 to identify which devices (SBCs 121/SIP servers 120) are in the communication path between the elements at the level 151A and the communication endpoints 101A-101N. The hierarchical tree 150A may be maintained by the SIP server 120A and/or the feature server 130.

In this example, the SIP server 120A is at level 151A. The communication endpoints 101A-101B that are directly connected to the SIP server 120A are at the endpoint level 152 with no intervening levels because there are no other communication devices in the communication path between the SIP server 120A and the communication endpoints 101A-101B.

The SBC 121A is at level 151B, which is connected to the communication network 110 via the communication link 131A. The SBC 121B, which is at level 151C below the SBC 121A at level 151B. The communication endpoints 101C-101D are below the SBC 121B at the endpoint level 152 because the communication endpoints 101C-101D are directly connected to the SIB 131B. The SBC 121C, which is at level 151C below the SBC 121A at level 151B. The communication endpoints 101E-101F are below the SBC 121C at the endpoint level 152 because the communication endpoints 101E-101F are directly connected to the SIB 131C.

The SBC 121N, which is at level 151C below the SBC 121A at level 151B. The SIP server 120N is at level 151D below the SBC 121N. The communication endpoints 101G-101N are below the SIP server 120N at the endpoint level 152 because the communication endpoints 101G-101N are directly connected to the SIP server 120N.

Figure 1C:
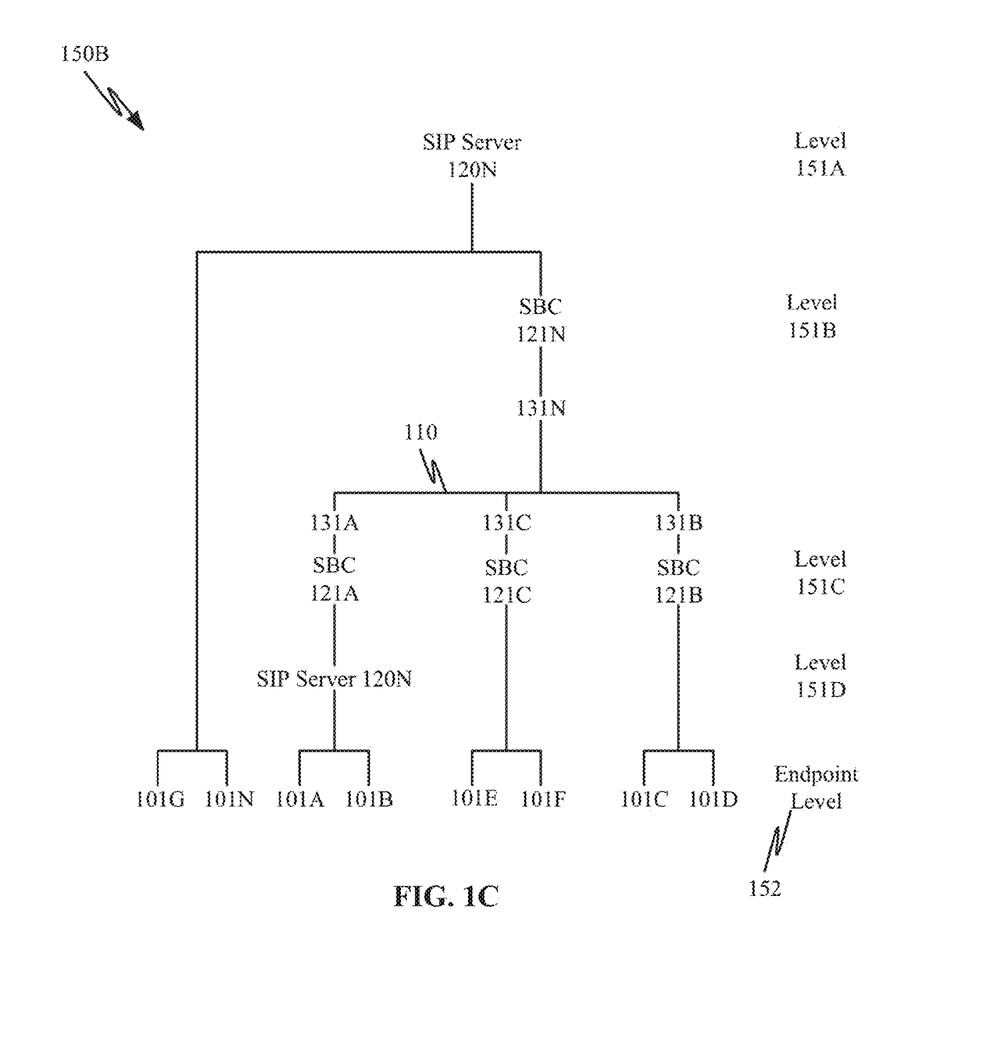
FIG. 1C is a diagram of a hierarchical tree for a second SIP server.

FIG. 1C is a diagram of a hierarchical tree 150B for the SIP server 120N. The hierarchical tree 150B for the SIP server 120N is similar to the hierarchical tree 150A for the SIP server 120A. In this example, each of the SIP servers 120A-120N can see all the elements on the communication network 110. The SBC 121B and the attached communication endpoints 101C-101D can be seen by both the SIP servers 120A and 120N. The difference is that the SIP server 120A sees the SBC 121B via the SBC 121A where the SIP server 120N sees the SBC 121B via the SBC 121N. In other words, the SIP server 120A sees the SBC 121B via a different communication path or route than the SIP server 120N.

By being able to see different elements via different routes, the feature server 130 can determine which locations 1-N are unreachable. For example, if the communication link 131N failed, the SIP server 120A would still be able to see the SBCs 121B and 121C and thus should be able to see the communication devices 101C-101F.

In FIGS. 1B-1C, the level 151A (the top level) is a SIP server 120. However, in other embodiments, the top level 151A may begin with a SBC 121 or another type of device. Alternatively, the top level may begin with a SBC 121 in cases where a SIP server 120 (or all SIP servers 120) has failed.

Figure 2:
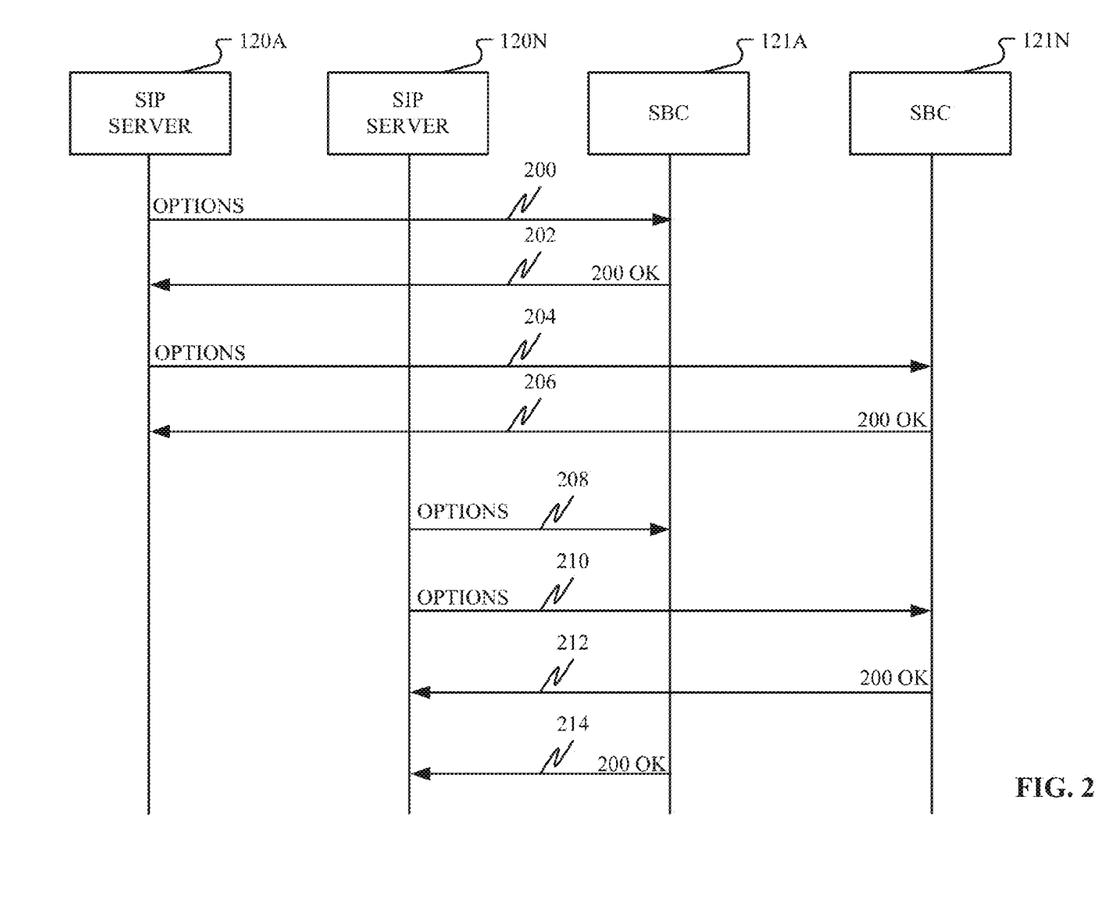
FIG. 2 is a flow diagram of a process for identifying whether communication endpoints at multiple locations are reachable.

FIG. 2 is a flow diagram of a process for identifying whether communication endpoints 101 at multiple locations are reachable. Illustratively, the communication endpoints 101A-101N, the SIP servers 120A-120N, the SBCs 121A-121N, the feature server 130, and the proxy server 140 are stored-program-controlled entities, such as a computer or processor, which performs the method of FIGS. 2-7 and the processes described herein by executing program instructions stored in a non-transitory computer readable storage medium, such as a memory or disk. Although the methods described in FIGS. 2-7 are shown in a specific order, one of skill in the art would recognize that the steps in FIGS. 2-7 may be implemented in different orders and/or be implemented in a multi-threaded environment. Moreover, various steps may be omitted or added based on implementation.

At startup, the SIP servers 120 discover locations where the SBCs 121 are the primary gateways for the particular SIP server 120. The SIP servers 120 start polling (querying) the SBCs 121 associated with the SIP servers 120 using SIP OPTIONS messages.

The SIP server 120A sends a SIP OPTIONS message to the SBC 121A in step 200. The SBC 121A sends a SIP 200 OK message to the SIP server 120A in step 202. The SIP 200 OK of step 202 indicates that location 1 is reachable by the SIP server 120A. The SIP server 120A sends a SIP OPTIONS message to the SBC 121N in step 204. The SBC 121N sends a SIP 200 OK message to the SIP server 120A in step 206. The SIP 200 OK of step 206 indicates that location N is reachable by the SIP server 120A. Although not shown, the SIP server 120A sends SIP OPTIONS messages to the SBCs 121B and 121C to determine that locations 2 and 3 are reachable.

The SIP server 120N sends a SIP OPTIONS message to the SBC 121A in step 208. The SIP server 120A sends a SIP OPTIONS message to the SBC 121N in step 210. The SBC 121N sends a SIP 200 OK message to the SIP server 120A in step 212. The SBC 121A sends a SIP 200 OK message to the SIP server 120N in step 214. The SIP 200 OK messages of steps 212 and 214 indicate that locations 1 and N are reachable by the SIP server 120N. Although not shown, the SIP server 120N sends SIP OPTIONS messages to the SBCs 121B and 121C to determine that locations 2 and 3 are reachable.

Figure 3:
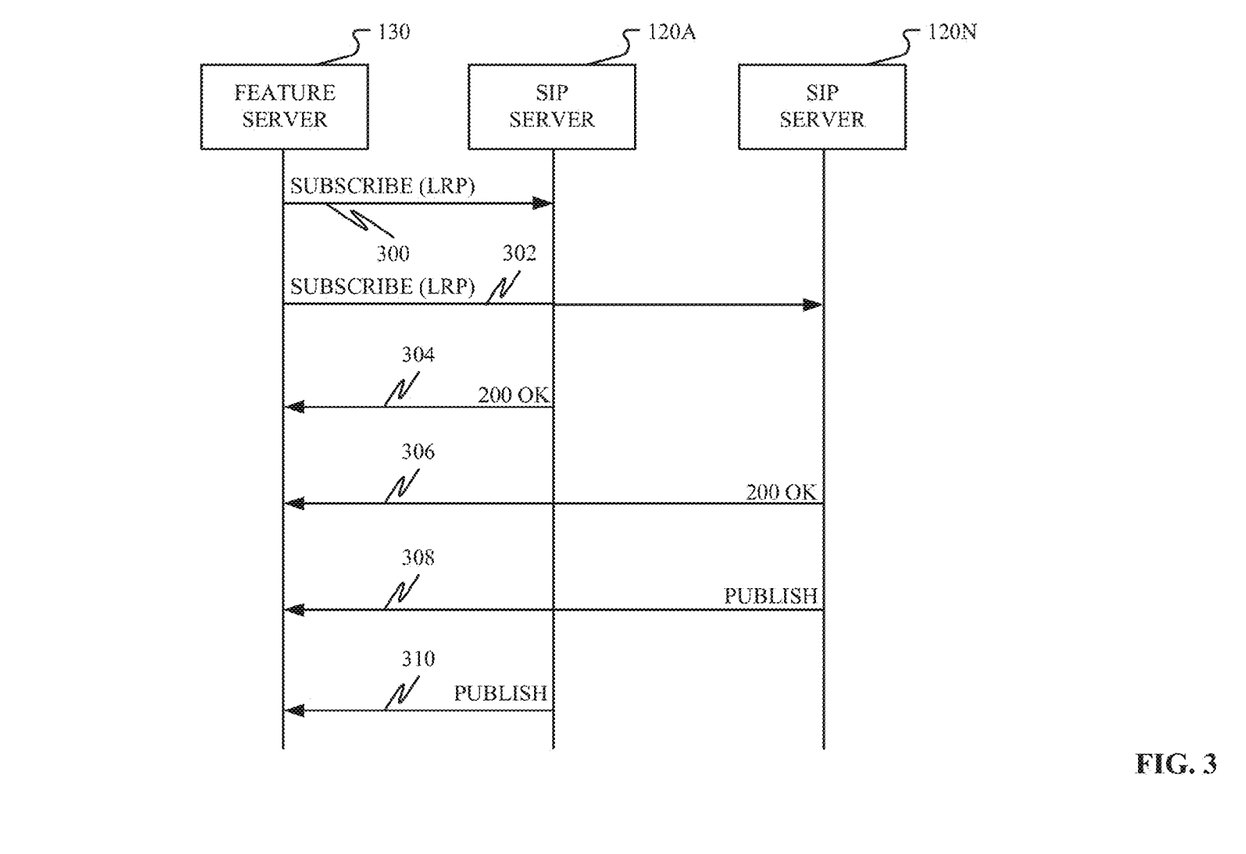
FIG. 3 is a flow diagram of a process of a feature server subscribing to get information regarding whether communication endpoints at different locations are reachable.

FIG. 3 is a flow diagram of a process of a feature server 130 subscribing to get information regarding whether communication endpoints 101 at different locations are reachable. The feature server 130 sends, in step 300, a SIP SUBSCRIBE with a location-reachability package to the SIP server 120A. The feature server 130 sends, in step 302 a SIP SUBSCRIBE with a location reachability package to the SIP server 120N.

An example of a location reachability package for the SIP server 120A is shown below in Table 1. The SIP server 120A populates the fields in the location reachability package and responds with a SIP PUBLISH message (described below).

TABLE 1

| Routing Element | SIP Server 120A |
|---|---|
| Reachable Locations | 1, 2, 3, N |
| Unreachable Locations | None |

The SIP server 120A responds to the SIP SUBSCRIBE of step 300 by sending a SIP 200 OK in step 304. The SIP server 120N responds to the SIP SUBSCRIBE of step 302 by sending a SIP 200 OK in step 306.

The SIP server 120N sends a SIP PUBLISH message to the feature server 130 in step 308. The SIP PUBLISH message of step 308 includes the populated location reachability package, which is based on the SIP 200 OK messages of step 212 and 214 that the SBCs 121A-121N at locations 1-N are reachable. The SIP server 120A sends a SIP PUBLISH message to the feature server 130 in step 310. The SIP PUBLISH message of step 310 includes the location reachability package (e.g., as shown in Table 1), which is based on the SIP 200 OK messages of step 202 and 206 that the SBCs 121A-121N at locations 1-N are reachable. The populated location reachabliltiy package indicates that there are no unreachable locations. At this point, the feature server 130 knows that the SIP servers 120A-120N are reachable. In addition, the feature server 130 knows that the SBCs 121A-121N are reachable via two different routes: one route from each of the SIP servers 120A-120N.

Figure 4:
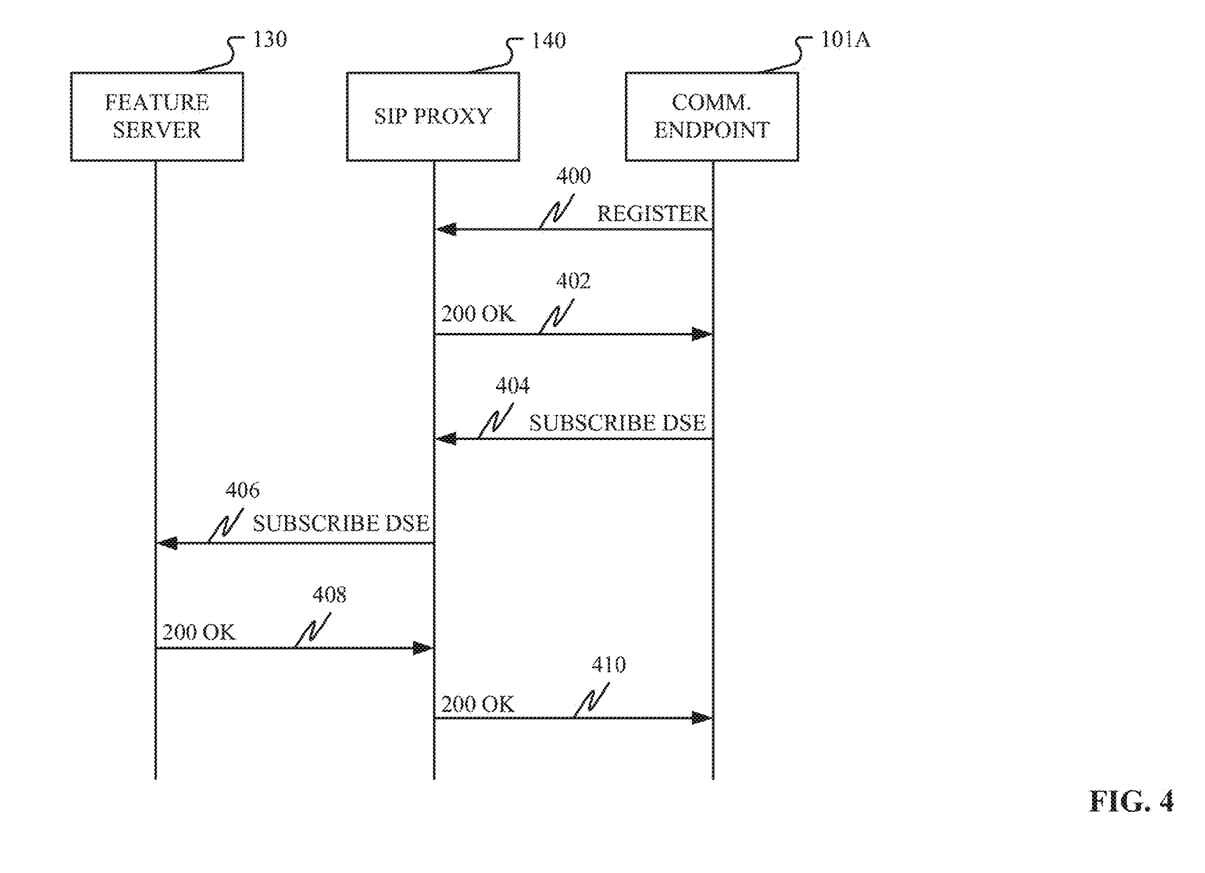
FIG. 4 is a flow diagram of a process for communication endpoints registering with a feature server.

FIG. 4 is a flow diagram of a process for communication endpoints 101 registering with a feature server 130. When the communication endpoint 101A becomes active, the communication endpoint 101A sends a SIP REGISTER message to the SIP proxy 140 in step 400. The SIP proxy 140 sends a SIP 200 OK message in step 402.

The communication endpoint 101A sends a SIP SUBSCRIBE message in step 404. In one embodiment the SIP SUBSCRIBE may contain a Dialog State Event (DSE) package as described in RFC 4235. The SIP SUBSCRIBE message with the DSE package is sent to the feature server 130 in step 406. The feature server 130 sends a SIP 200 OK to the SIP proxy 140 in step 408. The SIP proxy 140 sends the SIP 200 OK to the communication endpoint 101A in step 410.

The feature server 130 stores the location information (e.g., an address) of the communication endpoint 101A in a database. The address of the communication endpoint 101 is used by the feature server 130 for sending a SIP OPTIONS message to the communication endpoint 101A. The SIP OPTIONS message is used to determine if a communication endpoint 101A and/or a user of the communication endpoint 101A is available (e.g., a contact center agent is available to receive calls).

This process is repeated for each of the communication endpoints 101B-101N. At this point, the feature server 130 has the location of each communication endpoint 101A-101N and communication paths between the SIP servers 120A-120N/SBCs 121A-121N and the communication endpoints 101A-101N at the locations 1-N (e.g., as shown in FIGS. 1B-1C).

Figure 5:
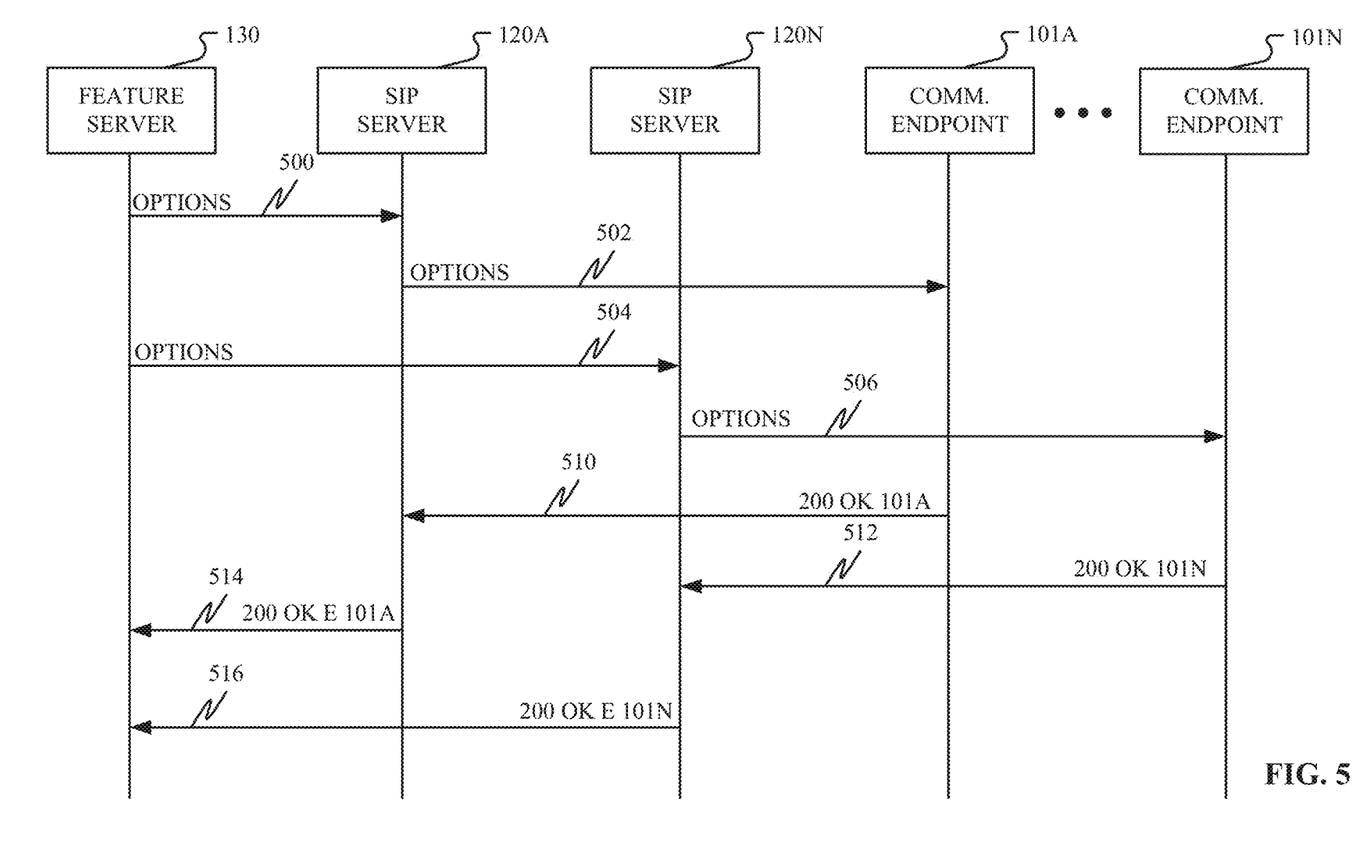
FIG. 5 is a flow diagram of a process for identifying available communication endpoints.

FIG. 5 is a flow diagram of a process for identifying available communication endpoints 101. Since the feature server 130 knows that all the SIP servers 120A-120N and the SBCs 121A-121N are available, the feature server 130 can start sending out SIP OPTIONS messages to the communication endpoints 101A-101N to determine if the communication endpoints 101A-101N and/or the users of the communication endpoints 101A-101N are available.

The feature server 130 sends a SIP OPTIONS message to the SIP server 120A in step 500. The SIP server 120A sends the SIP OPTIONS message to the communication endpoint 101A in step 502. The feature server 130 sends a SIP OPTIONS message to the SIP server 120N in step 504. The SIP server 120N sends the SIP OPTIONS message to the communication endpoint 101N in step 506.

In response to the SIP OPTIONS message of step 502, the communication endpoint 101A sends a SIP 200 OK indicating that the communication endpoint 101A is available in step 510. In response to the SIP OPTIONS message of step 506, the communication endpoint 101N sends a SIP 200 OK indicating that the communication endpoint 101N is available in step 512. The SIP server 120A sends the SIP 200 OK message of step 510 to the feature server 130 in step 514. The SIP server 120N sends the SIP 200 OK message of step 512 to the feature server 130 in step 516. In this example, the feature server 130 sends messages for the communication endpoints 101 that are directly attached to the respective SIP server 120 (communication endpoint 101A is directly connected to SIP server 120A and communication endpoint 101N is directly connected to SIP server 120N).

This process is repeated for the communication endpoints 101B-101G. The feature server 130 may send SIP OPTIONS messages to communication endpoints 101C-101F via either one of the SIP servers 120A-120N. The above process describes SIP OPTIONS messages being sent via different SIP servers 120A-120N. However, in other embodiments, the SIP OPTIONS messages may only be sent via a single SIP server 120. For example, in an embodiment where there is only a single SIP server 120 or where one SIP server 120A is a primary SIP server 120 and the SIP server 120N is a secondary SIP server 120.

In one embodiment, the SIP 200 OK messages of step 510 and 512 also include additional information. For example, the SIP 200 OK messages may also indicate that the user of the communication endpoint 101 is also available (or not available) for taking communications. For example, the SIP 200 OK message of step 510 may indicate that the user of the communication endpoint 101A is available for taking calls. Alternatively, the SIP 200 OK message of step 510 may indicate that the user of the communication endpoint 101A is available to take (or not take) communications in one more media types, such as, text, email, voice, video, and/or Instant Messaging.

Figure 6:
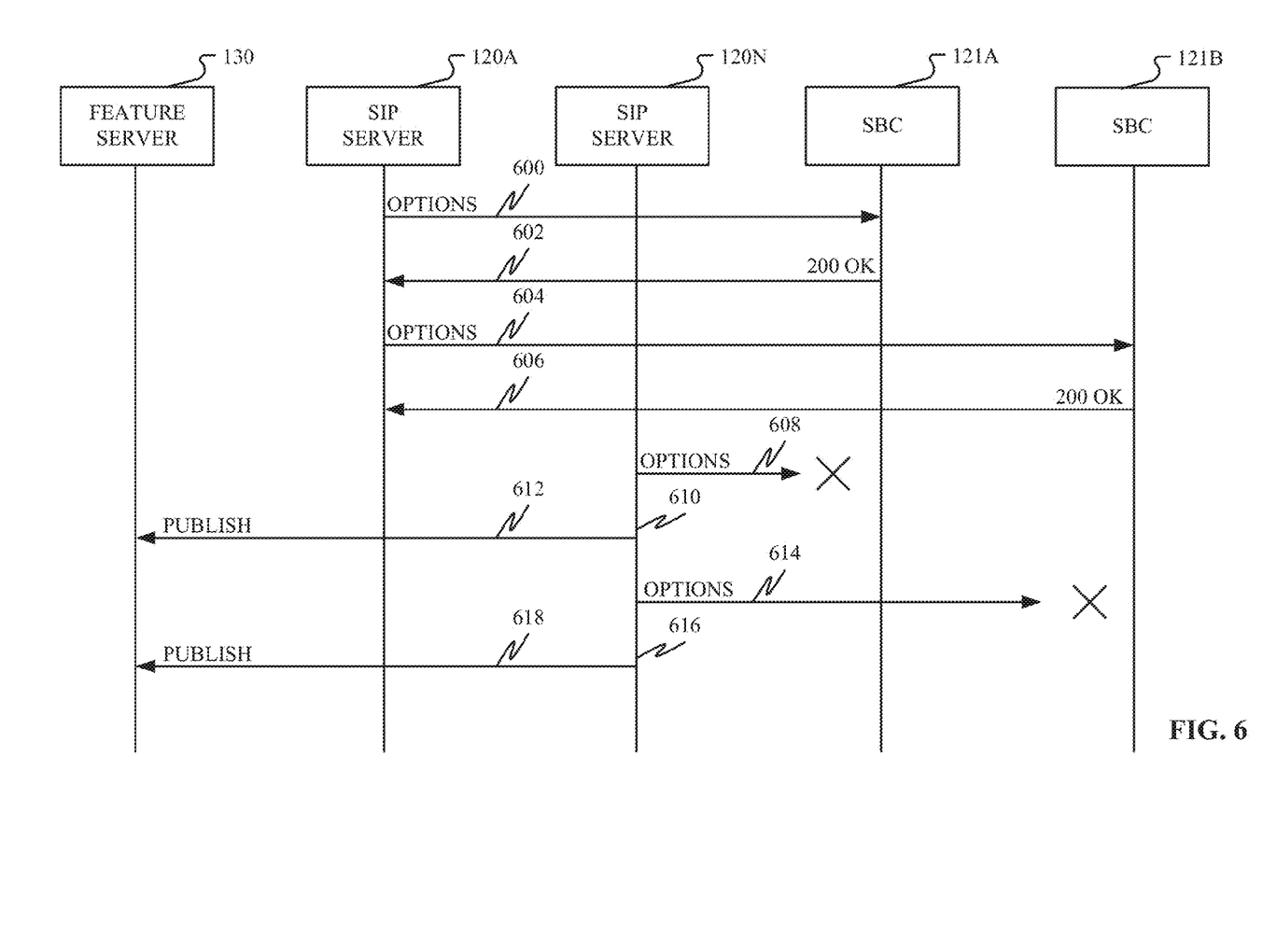
FIG. 6 is a flow diagram of a process of detecting that a location has become unreachable on an individual network route.

FIG. 6 is a flow diagram of a process of detecting that a location has become unreachable on an individual network path. As described previously, the SIP servers 120A-120N periodically send out SIP OPTIONS messages to verify that the SBCs 121A-121N are still available.

The SIP server 120A sends a SIP OPTIONS message to the SBC 121A in step 600. The SBC 121A responds by sending a SIP 200 OK message in step 602. The SIP server 120A sends a SIP OPTIONS message to the SBC 121B in step 604. The SBC 121B responds by sending a SIP 200 OK message in step 606. Although not shown this process is repeated for the other SBCs 121C-121N.

The SIP server 120N sends a SIP OPTIONS message to the SBC 121A in step 608. However, the SBC 121A is unreachable from the SIP Server 120N because the communication link 131N has failed. The SIP server 120N times out because a response is not received from the SBC 121A in step 610. In response to the timeout, the SIP server 120N sends a SIP PUBLISH message with the location reachability package via the communication link 131D to the feature server 130 in step 612. The SIP PUBLISH message of step 612 indicates that the SBC 121A at location 1 is not available to the SIP server 120N. The SIP server 120N sends a SIP OPTIONS message to the SBC 121B in step 614. Because the communication link 131N has failed, the SBC 121B does not receive the SIP OPTIONS message of step 614. The SIP server 120N times out in step 616. In response to the timeout, the SIP server 120N sends a second SIP PUBLISH message with the location reachability package indicating that the SBC 121B in location 2 is not reachable from the SIP server 120N in step 618. This process is repeated for SBC 121C, which is also not reachable. In this example, the SBC 121N would still be reachable to the SIP server 120N.

In this example, the SIP PUBLISH messages of steps 612 and 618 are sent separately. However, in other embodiments, the SIP PUBLISH messages of step 612 and 618 may be combined into a single SIP PUBLISH message (i.e., the SIP PUBLISH message of step 612 is not sent).

Since the SIP servers 120A-120N (and their corresponding communication endpoints 101A-101B and 101G-101N) can still be seen by the feature server 130 and the SBCs 121B-121C (and their corresponding communication endpoints 101C-101F) can be seen by SIP server 120A, the feature server 130 knows that it can still send SIP OPTIONS messages to each of the communication endpoints 101A-101N via at least one route. Thus, even though the communication link 131N has failed, the feature server 130 will continue to periodically send out SIP OPTIONS messages to the communication endpoints 101A-101N because they are all still reachable.

Figure 7:
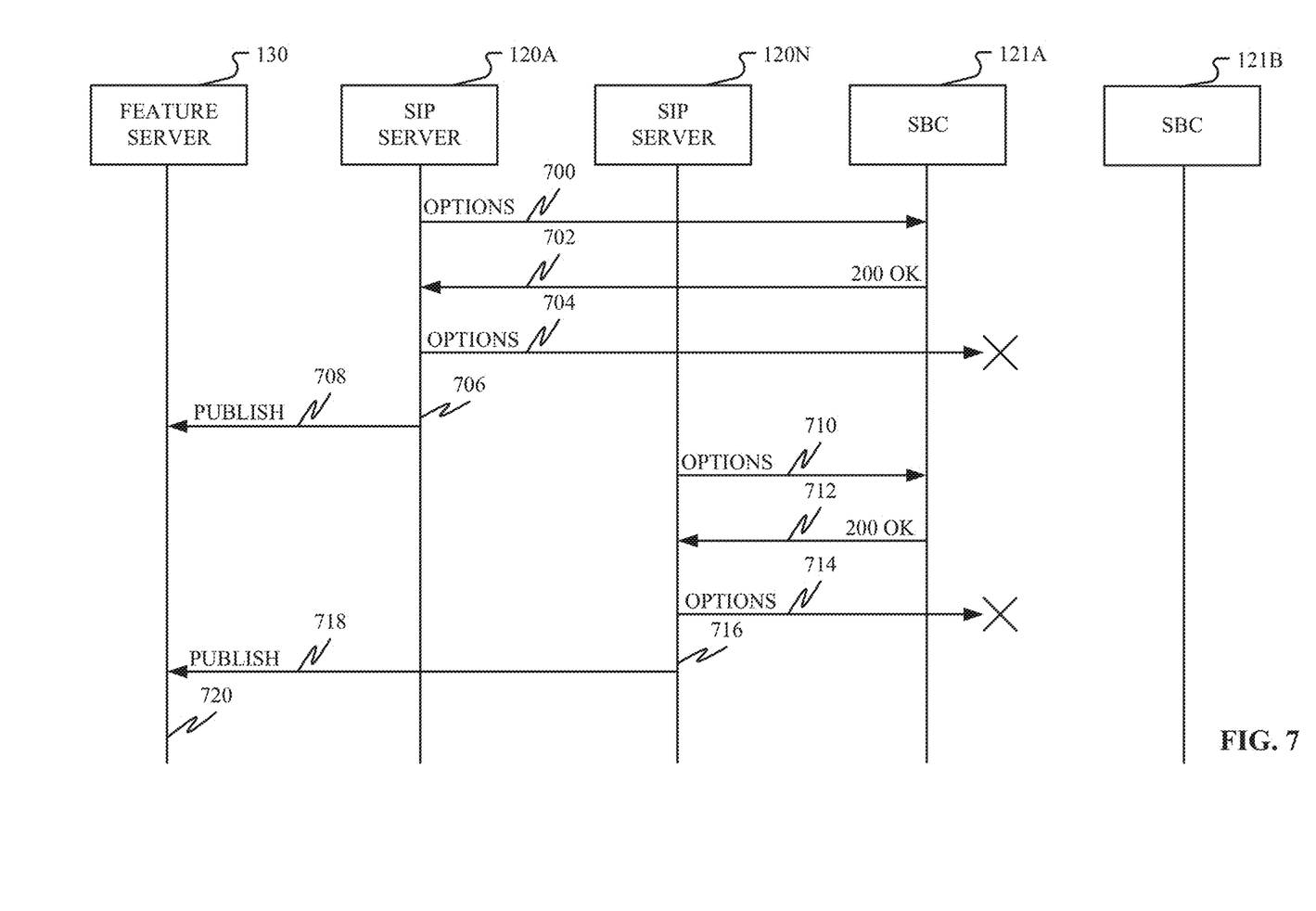
FIG. 7 is a flow diagram of a process for determining that a location has become unreachable.

FIG. 7 is a flow diagram of a process for determining that a location has become unreachable. The SIP server 120A sends a SIP OPTIONS message to the SBC 121A in step 700. The SBC 121A responds by sending a SIP 200 OK message in step 702. The SIP server 120A sends a SIP OPTIONS message to the SBC 121B in step 704. In this example, the SBC 121B has failed and therefore fails to respond to the SIP OPTIONS message of step 704. In response, the SIP server 120A times out in step 706. The SIP server 120A sends a SIP PUBLISH message with the location reachability package in step 708 indicating that the SBC 121B in location 2 is unreachable by the SIP server 120A.

The SIP server 120N sends a SIP OPTIONS message to the SBC 121A in step 710. The SBC 121A responds by sending a SIP 200 OK message in step 712. The SIP server 120A sends a SIP OPTIONS message to the SBC 121B in step 724. The SBC 121B fails to respond to the SIP OPTIONS message of step 714. In response, the SIP server 120A times out in step 716. The SIP server 120A sends a SIP PUBLISH message with the location reachability package in step 718 indicating that the SBC 121B in location 2 is unreachable by the SIP server 120N.

At this point, the feature server 130 is aware that the SBC 121B is unreachable via either of the SIP servers 120A-120N. Based on the hierarchical trees of FIGS. 1B-1C, the feature server 130 know that the SBC 121B's two communication endpoints 101C-101D are also unreachable. Thus, the feature server 130 forgoes from periodically sending SIP OPTIONS messages to the communication endpoints 101C-101D.

In this example, the SIP servers 120A-120N will periodically send out SIP OPTIONS messages (e.g., as in step 200 of FIG. 2) to the SBC 121B to determine when the SBC 121B becomes active. When the SBC 121B becomes active, the feature server 130 will start to send the periodic SIP OPTIONS messages to the communication endpoints 101C-101D associated with the SBC 121B.

The above process described where a SBC 121 is unreachable. However, the same process can be used to determine if a SIP server 120 has become unreachable. For example, if the communication links 131D and 131N fail, the feature server 130 will detect that the SIP server 120N is not reachable because the SIP OPTIONS message sent in step 504 would not receive a response. Likewise, the SIP server 120A would not be able to see the SBC 121N. Thus, the feature server 130 would not send SIP OPTIONS messages to the communication endpoints 101G-101N that are associated with the SIP server 120N.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
determining, by a microprocessor, a hierarchical network topology for identifying presence information of individual communication endpoints, wherein the hierarchical network topology comprises at least a first level and a communication endpoint level;
querying, by the microprocessor, a communication device at the first level to determine if the communication device at the first level is reachable via one or more routes on a computer network; and
in response to determining that the communication device at the first level is not reachable via any of the one or more routes, forbearing, by the microprocessor, from querying one or more communication endpoints associated with the communication device at the first level for the presence information.

2. The method of claim 1, further comprising:
determining that the communication device at the first level is now reachable via the one or more routes; and
in response to determining that the communication device at the first level is now reachable via the one or more routes, querying the one or more communication endpoints associated with the communication device at the first level for the presence information.

3. The method of claim 2, wherein querying the one or more communication endpoints associated with the communication device at the first level for the presence information further comprises receiving information that indicates if a user of one of the one or more communication endpoints is available to take a communication in one or more of a plurality of defined communication mediums.

4. The method of claim 1, wherein first level comprises a plurality of levels and wherein the communication device at the first level controls a plurality of communication devices at a second level through different routes.

5. The method of claim 4, wherein the communication device at the first level is a plurality of Session Initiation Protocol (SIP) servers and wherein a plurality of communication devices at the second level are a plurality of session border controllers (SBCs).

6. The method of claim 5, wherein the one or more routes comprises a plurality of routes and further comprising:
 determining that one of the plurality of SBCs is unreachable via a first one of the plurality of routes and is reachable via a second one of the plurality of routes; and
 in response to determining that the one of the plurality SBCs is unreachable via the first one of the plurality of routes and is reachable via the second one of the plurality of routes, querying one or more communication endpoints associated with the one of the plurality of SBCs for the presence information.

7. The method of claim 5, wherein a feature server sends one or more SIP SUBSCRIBE messages with a location-reachable package to the plurality of SIP servers.

8. The method of claim 7, wherein the plurality of SIP servers respond with a SIP PUBLISH message with the location-reachable package when one of the plurality SBCs becomes unavailable.

9. The method of claim 1, wherein querying the communication device at the first level is accomplished using a SIP OPTIONS message.

10. The method of claim 1, wherein the one or more communication endpoints associated with the communication device at the first level register with a feature server using a SIP SUBSCRIBE message.

11. A system comprising:
 a microprocessor; and
 a computer readable medium, coupled with the microprocessor and comprising microprocessor readable and executable instructions that cause the microprocessor to execute:
 a feature server that determines a hierarchical network topology for identifying presence information of individual communication endpoints, wherein the hierarchical network topology comprises at least a first level and a communication endpoint level, queries a communication device at the first level to determine if the communication device at the first level is reachable via one or more routes on a computer network, and forbears from querying one or more communication endpoints associated with the communication device at the first level for the presence information in response to determining that the communication device at the first level is not reachable via any of the one or more routes.

12. The system of claim 11, wherein the feature server determines that the communication device at the first level is now reachable via the one or more routes and queries the one or more communication endpoints associated with the communication device at the first level for the presence information in response to determining that the communication device at the first level is now reachable via the one or more routes.

13. The system of claim 12, wherein querying the one or more communication endpoints associated with the communication device at the first level for the presence information further comprises receiving information that indicates if a user of one of the one or more communication endpoints is available to take a communication in one or more of a plurality of defined communication mediums.

14. The system of claim 11, wherein first level comprises a plurality of levels and wherein the communication device at the first level controls a plurality of communication devices at a second level through different routes.

15. The system of claim 14, wherein the communication device at the first level is a plurality of Session Initiation Protocol (SIP) servers and wherein the plurality of communication devices at the second level are a plurality of session border controllers (SBCs).

16. The system of claim 15, wherein the one or more routes comprises a plurality of routes and wherein the feature server determines that one of the plurality SBCs is unreachable via a first one of the plurality of routes and is reachable via a second one of the plurality of routes and queries one or more communication endpoints associated with the one of the plurality of SBCs for the presence information in response to determining that the one of the plurality of SBCs is unreachable via the first one of the plurality of routes and is reachable via the second one of the plurality of routes.

17. The system of claim 15, wherein the feature server sends one or more SIP SUBSCRIBE messages with a location-reachable package to the plurality of SIP servers.

18. The system of claim 17, wherein the plurality of SIP servers respond with a SIP PUBLISH message with the location-reachable package when one of the plurality SBCs becomes unavailable.

19. The system of claim 11, wherein the one or more communication endpoints associated with the communication device at the first level register with a feature server using a SIP SUBSCRIBE message.

20. A system comprising:
 a microprocessor; and
 a computer readable medium, coupled with the microprocessor and comprising microprocessor readable and executable instructions that cause the microprocessor to:
 determine a hierarchical network topology for identifying presence information of communication endpoints, wherein the hierarchical network topology comprises at least a first level, a second level, and an endpoint level, wherein a plurality of Session Initiation Protocol (SIP) servers at the first level controls a plurality Session Border Controllers (SBCs) at the second level through different routes;
 query the plurality of SIP servers at the first level to determine if the plurality of SIP servers at the first level are reachable via one or more routes on a computer network; and
 forbear from querying one or more communication endpoints associated with at least one of the plurality of SIP servers at the first level for the presence information in response to determining that the at least one of plurality of SIP servers at the first level is not reachable via any of the one or more routes.

* * * * *